United States Patent [19]

Nishimoto

[11] Patent Number: 4,783,152
[45] Date of Patent: Nov. 8, 1988

[54] VARIABLE FOCAL LENGTH LENS

[75] Inventor: Yoshifumi Nishimoto, Yokohama, Japan

[73] Assignee: Canon Kabushiki Kaisha, Tokyo, Japan

[21] Appl. No.: 814,777

[22] Filed: Dec. 30, 1985

[30] Foreign Application Priority Data

Jan. 9, 1985 [JP] Japan .................................... 60-859

[51] Int. Cl.$^4$ .............................................. G02F 1/19
[52] U.S. Cl. ..................... 350/379; 350/382; 369/110
[58] Field of Search ........ 350/356, 379, 380, 382–383, 350/388, 401, 403, 411, 437; 354/400, 403; 369/110, 112; 365/121

[56] References Cited

U.S. PATENT DOCUMENTS

| | | | |
|---|---|---|---|
| 3,520,592 | 7/1970 | Leib et al. | 350/379 |
| 3,658,409 | 4/1972 | Shimbo et al. | 350/382 |
| 4,037,929 | 7/1977 | Bricot et al. | 369/110 |
| 4,124,273 | 11/1978 | Huignard et al. | 350/379 |
| 4,264,986 | 4/1981 | Willis | 369/110 |
| 4,466,703 | 8/1984 | Nishimoto | 350/379 |
| 4,564,267 | 1/1986 | Nishimoto | 350/379 |

FOREIGN PATENT DOCUMENTS 1252276 11/1971 United Kingdom .

*Primary Examiner*—John K. Corbin
*Assistant Examiner*—Martin Lerner
*Attorney, Agent, or Firm*—Fitzpatrick, Cella, Harper & Scinto

[57] ABSTRACT

There is disclosed a variable focal length lens comprising: an optical element showing substantially different refraction characteristics depending on polarization characteristics of an incident light beam, first optical unit for controlling the polarization characteristics of the beam incident on said optical element; and second optical unit for controlling the polarization characteristics of the light subjected to predetermined refraction by the optical element, the second optical unit being interlocked with the first optical unit.

4 Claims, 2 Drawing Sheets

VARIABLE FOCAL LENGTH LENS

BACKGROUND OF THE INVENTION

1. Field of the Invention

The present invention relates to a variable focal length lens and, more particularly, to an improvement in a lens, a focal length of which can be changed at high speed in response to an electrical signal

2. Description of the Prior Art

A focal length in a conventional variable focal length optical lens system, called a "zoom lens", is changed by moving a plurality of lens groups each constituted by a plurality of single lenses, thus changing distances between the lens groups. In such a lens system, however, a moving mechanism is required to move the lens groups. The conventional lens system does not sufficiently satisfy desired high-speed change in focal length, compactness, and low cost requirement. Demand has arisen for a new and improved lens system which gives better performance.

Variable focal length lenses which solve the above problems and substantially eliminate moving parts are proposed by the present applicant in Japanese Patent Application Laid-open Nos. 157213/1982, 118618/1983, and 10224/1985, and in U.S. Pat. No. 3,520,592, issued to K. G. Leib et al. U.S. Pat. No. 3,520,592 and Japanese Patent Application Laid-open No. 10224/1985 describe simple variable focal length lenses which achieve highspeed operation. More particularly, such a variable focal length lens has a solid-state lens with optical anisotropy and a means for changing a polarization direction of light incident on the lens.

FIG. 1 is a schematic view showing a variable focal length lens proposed by Japanese Patent Disclosure No. 10224/1985.

Referring to FIG. 1, the variable focal length lens has a polarizing plate 1, a polarization plane rotating element 2, a birefringent lens 3, a power source 4, and a switch 5.

The polarization plane rotating element 2 rotates a plane of polarization of light transmitted through the polarizing plate 1 upon application of an electric field. For example, the element 2 is prepared by forming transparent electrodes on two major surfaces of a Z-cut monocrystalline $KH_2PO_4$ plate.

The birefringent lens 3 is formed such that its optical axis (referred to as a Z-axis hereinafter) of crystal is perpendicular to the principal axis of the lens, and parallel to the surface of the drawing of FIG. 1. A refractive index of the birefringent lens 3 along a polarization direction perpendicular to the principal axis of the lens and parallel to the surface of the drawing is given as an ordinary ray refractive index n0, and a refractive index thereof along a polarization direction perpendicular to the principal axis of the lens and to the surface of the drawing is given as an extraordinary ray refractive index ne.

More specifically, referring to FIG. 1, light linearly polarized by the polarizing plate 1 is incident on the birefringent lens 3 without changing the polarization direction when the switch 5 is open. The light passing through the birefringent lens 3 is refracted at the refractive index n0, and thus has a focal length f1. In this case, the transmitted light has the same polarization direction as that of the incident light, i.e., a direction parallel to the surface of the drawing. However, when the switch 5 is closed, the polarization plane of the transmitted light is rotated 90°, by the polarization plane rotating element 2, relative to that of the incident light, i.e., the former coincides with a direction perpendicular to the surface of the drawing. Light passing through the birefringent lens 3 thus has a focal length f2, determined by the refractive index ne.

The conventional variable focal length lens for changing the polarization direction of light has an advantage in that the focal length can be changed within a wide range.

FIG. 2 is a schematic view of a optical information readout apparatus which adopts a variable focal length lens. The apparatus in FIG. 2 has a variable focal length lens 8.

A laser beam from a semiconductor laser 6 is focused on an optical information recording plate 12 through a collimator lens 7, a variable focal length lens 8, a polarized beam splitter 9, a ¼ wavelength plate 10, and a focusing lens 11. The beam reflected by the optical information recording plate 12 reaches the polarized beam splitter 9 by passing through the focusing lens 11 and the ¼ wavelength plate 10 again.

The reflected beam incident on the polarized beam splitter 9 passes through the ¼ wavelength plate beam splitter 10 twice on the forward and backward paths. The polarization direction is changed from the polarization direction of the beam incident on the polarized beam splitter 9 to a direction perpendicular thereto. The reflected beam is thus reflected by a multilayer film formed on a diagonal line of the polarized beam splitter 9. The twice-reflected beam is focused on a photodetector 14 through a detection lens 13. The photodetector 14 converts the laser beam to an electric current, in accordance with the intensity of the beam. The processor analog current signal is converted by a data processor 15 to digital data.

In an optical data readout apparatus as described above, the direction of the linearly polarized beam incident on the polarized beam splitter 9 must always be constant.

However, when the apparatus adopts the conventional variable focal length lens shown in FIG. 1, the linearly polarized beam exit-direction is changed every time the focusing length is changed. As a result, the direction of the linearly polarized beam incident on the polarized beam splitter 9 cannot always be kept constant.

In a apparatus using a linearly polarized beam such as a laser beam, and exemplified by but not limited to the optical data readout apparatus, at least one optical element associated with the plane of polarization, such as a λ/4 plate or a polarized beam splitter, must often be used in consideration of specifications and apparatus configuration. In a conventional variable focal length lens, a desired focal length can be selected at high speed. However, such a lens is not compatible with all other optical apparatuses.

SUMMARY OF THE INVENTION

The present invention has been made in consideration of the above situation, and has as its object to provide a variable focal length lens wherein a switching between at least two polarization directions can be performed at an identical focal length, and a light beam having a predetermined polarization direction can always be generated.

In order to achieve the above object of the present invention, there is provided a variable focal length lens which has an optical element having substantially different refraction characteristics depending on the polarization characteristics of the incident light beam, first optical means for controlling the polarization characteristics of the light beam incident on the optical element, and a second optical means for controlling polarization characteristics of the light beam subjected to desired refraction by the optical element, in accordance with the polarization characteristics determined by the first optical means.

DETAILED DESCRIPTION OF THE PREFERRED EMBODIMENTS

Figure 3:
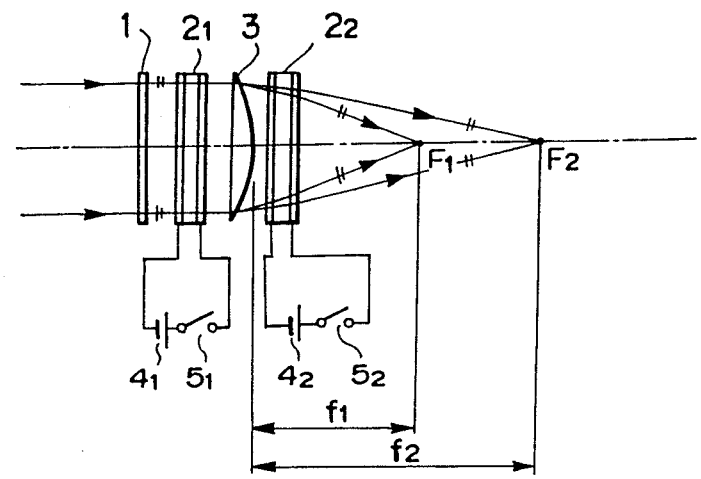
FIGS. 3 and 4 are schematic views showing variable focal length lenses according to first and second embodiments of the present invention, respectively.

FIG. 3 is a schematic view of a variable focal length lens according to a first embodiment of the present invention.

Referring to FIG. 3, the variable focal length lens has a polarizing plate 1, polarization plane rotating elements $2_1$ and $2_2$, a birefringent lens 3, power sources $4_1$ and $4_2$, and switches $5_1$ and $5_2$. The arrangement of the variable focal length lens of the first embodiment is substantially the same as that of the conventional lens, except that another polarization plane rotating device consisting of the polarization plane rotating element $2_2$, the power source $4_2$, and the switch $5_2$ is added behind the birefringent lens 3.

A method of changing a focal length in the first embodiment is the same as in the conventional apparatus. According to the first embodiment, the polarization direction of an exit beam can be in a predetermined direction. For example, in order to align the polarization direction of the exit beam with that of the incident beam (i.e., a direction parallel to the surface of the drawing in FIG. 3), when the switch $5_1$ is opened, the direction of the polarized light from the birefringent lens 3 is parallel to that of the surface of the drawing, and the beam passing through the polarization plane rotating element $2_2$ is kept parallel to the surface of the drawing under the condition that the switch $5_2$ is also open. However, when the switch $5_1$ is closed, the polarization direction of the exit beam from the birefringent lens 3 is perpendicular to the surface of the drawing. In this case, when the switch $5_2$ is also closed, the polarized beam from the polarization plane rotating element $2_2$ is rotated through 90°. As a result, the polarization direction of the exit beam is the same as that of the incident light, i.e., in a direction parallel to the surface of the drawing. Therefore, even if the focal length is changed from f1 to f2, the polarization direction is kept constant.

Figure 1:
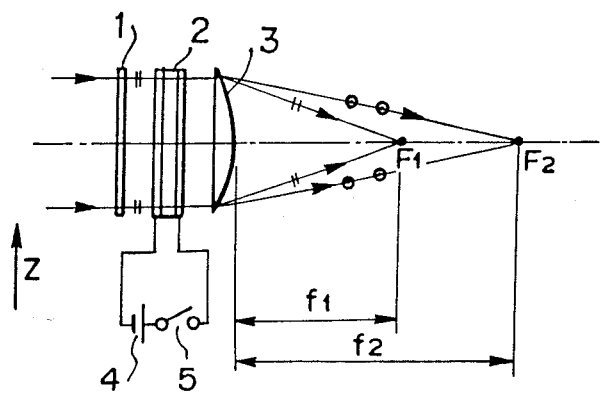
FIG. 1 is a schematic view showing a conventional variable focal length lens.
Figure 2:
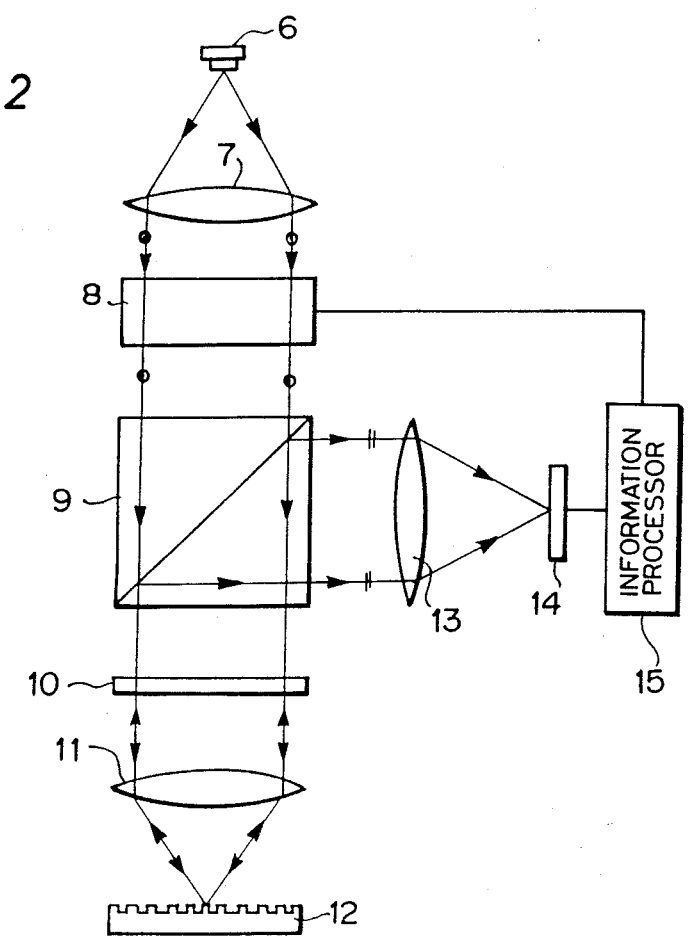
FIG. 2 is a schematic view showing an optical data readout apparatus using a variable focal length lens.

When the variable focal length lens shown in FIG. 3 is used as the variable focal length lens 8 for a beam-focusing position control lens in the optical data readout apparatus of FIG. 2, the final polarization direction is kept constant even when the polarization direction is changed to control the focusing position, thereby obtaining the desired functions. The polarization direction of the polarized beam splitter 9 is kept equal to that of the laser beam.

When the variable focal length lens according to this embodiment is used in the optical readout apparatus described previously or in another optical system, the polarization plane rotating elements $2_1$ and $2_2$ shown in FIG. 3 are operated together to obtain a desired polarization direction suitable for a given application. Referring to FIG. 2, a program for operation of the switches $5_1$ and $5_2$ for switching the polarization plane rotating elements $2_1$ and $2_2$ is loaded in the data processor 15 (including a CPU) so as to set a polarization direction compatible with that of the beam incident on the polarized beam splitter 9. This software structure can also be applied to a variable focal length lens of a second embodiment (to be described later).

According to the variable focal length lens of the first embodiment, the polarization characteristics of the beam can be arbitrarily changed in accordance with the characteristics of the apparatus or optical system used and e.g., an object to be photographed. The variable focal length lens is effective for an optical system with the above-mentioned polarized beam splitter.

Figure 4:
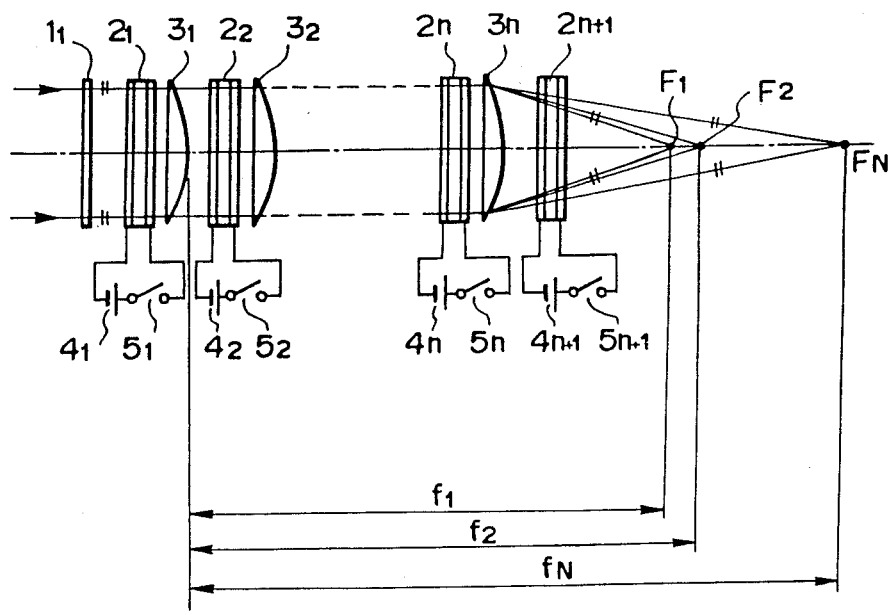

FIG. 4 is a schematic view of a variable focal length lens according to a second embodiment of the present invention.

Referring to FIG. 4, a variable focal length lens has a polarizing plate 1, polarization plane rotating elements $2_1, 2_2, \ldots, 2_n, 2_{n+1}$; birefringent lenses $3_1, 3_2, \ldots 3_n$ with different radii of curvature; power sources $4_1, 4_2, \ldots 4_n, 4_{n+1}$; and switches $5_1, 5_2 \ldots, 5_n, 5_{n+1}$.

N lenses alternate with (n+1) polarization plane rotating elements, birefringent lenses, power sources, and switches, as shown in FIG. 4.

In this embodiment, selective switching of the switches $5_1, 5_2, \ldots 5_n$ allows discrete setting of focal points F1, F2, ... FN (where $N=2^n$). In addition, when the switch $5_{n+1}$ for the last polarization plane rotating element $2_{n+1}$ is open/closed in the same manner as in the first embodiment, the polarization direction of the exit beam can be predetermined in the same manner as in the first embodiment.

Combinations of ON/OFF operations of the switches $5_1, 5_2, \ldots 5_n$, and $5_{n+1}$ are controlled by a control system (not shown) including a microcomputer, in a practical application. A desired one of the focal lengths f1, f2, ... fN can be selected using a beam with a predetermined polarization direction.

The present invention is not limited to the particular embodiments described above. Various changes and modifications may be made within the spirit and scope of the invention.

For example, the polarization direction of the exit beam may be different from that of the incident beam.

The polarization plane rotating element changes the polarization direction upon application of an electric field thereto. However, the plane rotating element can be constituted by an element using a phase compensating plate, an element for rotating a polarization direction by a birefringence using a mechanical load with an optical elastic effect, or an element such as a Faraday rotator, for rotating the polarization direction by using a magnetic Faraday effect.

The optical axis of the birefringent lens and its shape are not limited to those of the above embodiments.

In the above embodiments, the birefringent lens is exemplified as an optical element for substantially changing the refraction characteristics depending on the polarization characteristics of the incident beam. However, a liquid crystal lens for orienting crystal molecules in any selected direction can be used in place of the birefringent lens. In addition, if an optical element has the above-mentioned characteristics, any optical element can be used.

In the above embodiments, the polarizing plate 1 is used to obtain the linearly polarized beam. However, when a substantially linearly polarized laser beam is used, the polarizing plate 1 can be omitted.

According to the variable focal length lens of the present invention as described above, although the focal length is changed by changing the polarization direction of the beam, the polarization direction of the exit beam can be predetermined. The variable focal length lens can be suitably used in the optical data readout apparatus of FIG. 2 and can also be applied to optical pickup optical systems (e.g., an optical disk), a position detection apparatus using the principle of AF (Auto Focus), and optical systems using various types of polarized beams.

When the variable focal length lens is used in a specific optical system, the lens can be arranged at any position not interfering with the function of the apparatus. The polarization plane rotating elements, the birefringent lenses, and/or first and second optical means need not be arranged adjacent to each other.

I claim:

1. An optical system provided with a variable focal length lens and for being in an optical information readout apparatus, comprising:

supplying means for supplying a light beam;

a polarization beam splitter for directing a first light beam to an information recording plate, said first light beam being polarized in a first direction;

variable focal length lens means disposed in a light path between said supplying means and said beam splitter, said lens means including means for rotating a polarization plane of light and a birefringent lens for providing different focal lengths according to the polarization plane of the light from said rotating means;

control means for making the polarization plane of the light from said birefringent lens the same with that of said first light beam, irrespective of the state of the polarization plane of the light from said rotating means, and causing said first light beam to enter said beam splitter;

a $\lambda/4$ plate disposed in a light path between said beam splitter and said information recording plate, said $\lambda/4$ plate converting said first polarized light beam from said beam splitter to circularly polarized beam, and said $\lambda/4$ plate causing said first light beam to enter said information recording plate, and said $\lambda/4$ plate converting a second light beam reflected by said information recording plate to a second light beam polarized in a second direction whose polarization plane is rotated by 90° relative of that of said first light beam and directing said second light beam to said beam splitter;

a photodetector for receiving said second light beam from said beam splitter; and information processing means for converting a signal from said photoconductor to information.

2. An optical system according to claim 1, wherein said information processing means controls said rotating means and said control means in conjunction with each other.

3. An optical system according to claim 2, wherein said control means consists of means for rotating a polarization plane of light.

4. An optical system according to claim 1, wherein said information processing means produces a signal which indicates a light-focused position of the light relative to said information recording plate.

* * * * *

UNITED STATES PATENT AND TRADEMARK OFFICE
CERTIFICATE OF CORRECTION

PATENT NO. : 4,783,152
DATED : November 8, 1988
INVENTOR(S) : YOSHIFUMI NISHIMOTO It is certified that error appears in the above-identified patent and that said Letters Patent is hereby corrected as shown below:

COLUMN 1

Line 30, "highspeed" should read --high-speed--.

COLUMN 5

Line 30, "being in" should be --being used in--.

COLUMN 6

Line 21, "of that" should read --to that--.

Signed and Sealed this

Eighteenth Day of July, 1989

Attest:

DONALD J. QUIGG

Attesting Officer

Commissioner of Patents and Trademarks